United States Patent

Sanchez et al.

[11] Patent Number: 5,912,436
[45] Date of Patent: Jun. 15, 1999

[54] CO-EXTRUDED ELECTRIC CONDUCTOR CABLE IN THREE INSULATING LAYERS OF LOW HUMIDITY ABSORPTION ELECTRIC METHOD LOW SMOKE AND TOXIC GAS EMISSION FLAME RETARDANT

[75] Inventors: Alfonso Perez Sanchez; Ivan Marino De La Huerta; Octavio Parra Tabla; Arturo Hjort Delgado, all of Querétaro, Mexico

[73] Assignee: Servicios Condumex S.A. de C.V., Queretaro, Mexico

[21] Appl. No.: 08/791,230

[22] Filed: Jan. 30, 1997

[30] Foreign Application Priority Data

Aug. 9, 1996 [MX] Mexico ..................................... 963299

[51] Int. Cl.$^6$ ....................................................... H01B 7/00
[52] U.S. Cl. ................... 174/121 A; 174/121 SR
[58] Field of Search ........................... 174/121 R, 110 V, 174/110 SR, 120 R, 120 SC, 120 AR, 121 A, 121 SR

[56] References Cited

U.S. PATENT DOCUMENTS

| 3,711,631 | 1/1973 | Denes | 174/120 SR |
| 3,956,567 | 5/1976 | Krackeler et al. | 428/379 |
| 4,381,364 | 4/1983 | Georgacopoulos et al. | 524/373 |
| 4,447,569 | 5/1984 | Brecker et al. | 524/109 |
| 4,452,937 | 6/1984 | Keogh | 174/110 SR |
| 5,036,121 | 7/1991 | Coaker | 174/110 V |
| 5,716,574 | 2/1998 | Kawasaki | 264/171.17 |

*Primary Examiner*—Nestor Ramirez
*Assistant Examiner*—Joseph Waks
*Attorney, Agent, or Firm*—Carmen Pili-Curtis

[57] ABSTRACT

A coextruded triple layer electric conductor for cable insulation having low humidity absorption, low emission of toxic gases, low smoke emission and high flame retardance comprising a first layer comprising polyvinyl chloride as a base over an electric conductor core, a second layer over first layer, comprising high density polyethylene optionally modified with an ethylene copolymer, and a third layer over said second layer comprising polyvinyl chloride as a base.

21 Claims, 1 Drawing Sheet

CO-EXTRUDED ELECTRIC CONDUCTOR CABLE IN THREE INSULATING LAYERS OF LOW HUMIDITY ABSORPTION ELECTRIC METHOD LOW SMOKE AND TOXIC GAS EMISSION FLAME RETARDANT

BACKGROUND OF THE INVENTION

Presently the manufacturing of electric cables and especially of electric cables for the building industry is limited to the use of a polyvinyl chloride (PVC) compound that forms the insulating layer of the electric conductor that can be colored or that can have a colored film.

The need to improve the product to meet the present requirements of the building industry indicates that a low humidity absorption measured through an electric method, low toxic gas emission, low smoke emission and flame resistance are required according to the Mexican norm NMX J-10.

A PVC compound is known that has additives usually known as mineral loads, said compound is made more hygroscopic affecting the fulfillment of the water absorption tests (electric method). However, it is impossible to predict from the mineral loads because those are the additives that give the flame, smoke and toxicity characteristics, among others.

In order to meet all these requirements the applicant has developed a new electric cable characterized by a triple co-extruded layer of insulating material that allows to have a waterproof barrier that meets all the requirements indicated by the NMX J-10 norm.

DESCRIPTION OF THE INVENTION

Hereinbelow the invention will be described with reference to the drawings of FIGS. 1 to 3, but of course without limiting the scope of said invention which relates to three aspects that allow to satisfactorily meet the requirements indicated in the NMX J-10 norm, including the water absorption aspect measured by the electric method:

a) Electric cable design with triple co-extruded insulating layer.
b) Manufacturing process of triple electric layer with triple co-extruded insulating layer.
c) Formulae for the PVC compounds used for the manufacturing of the electric cable with triple co-extruded insulating layer.

The manufacturing of electric cables for the building industry includes the application of a protective layer to the copper wire, known as electric insulation. For these processes, as main elements, vinyl halides are used such as polyvinyl chloride (PVC). However, their characteristics have to be modified, improved or increased through the use of other additives.

For this purpose, the applicable norm (NMX J-10 (Note Table I)) requires the water absorption test (mesured by electric method). In this test, the cable is immersed in a tub with water at 75 degrees C. and an electric current is passed through it, measuring the initial capacitance and its variation as well as the cable dielectric losses in a test of a determined period of time (7 to 14 days).

In order to reach this object, the applicant has developed a new cable in which instead of only one insulating layer, a triple co-extruded layer is used which permits to prevent water penetration.

It is known that the PVC is a polar polymer and that it is related to polar materials. Upon entering in contact with water (which presents a polar behavior) a diffusion (penetration) of said water towards the PVC compound begins.

There are also other factors that have to be taken into account in this phenomenon.

a) If the PVC compounds are formulated with hygroscopic mineral loads, water absorption increases.

Figure 1:
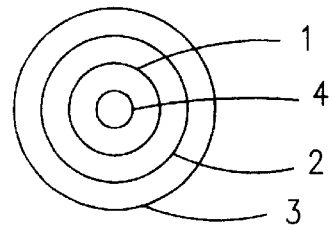
FIG. 1 corresponds to a cross section view in which the three concentrical layers around the conductor can be seen.
Figure 2:
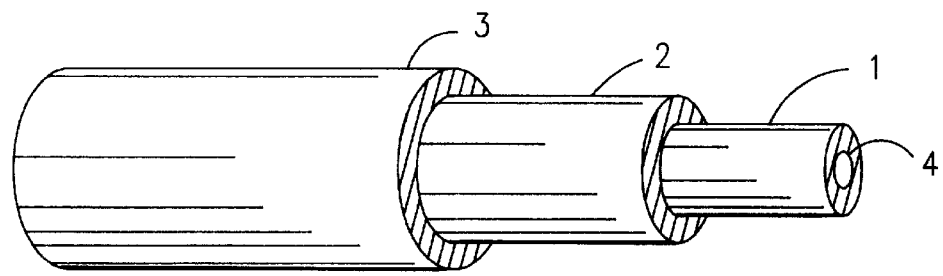
FIG. 2 corresponds to an isometric perspective view that shows the cross sections of the three concentric layers.
Figure 3:
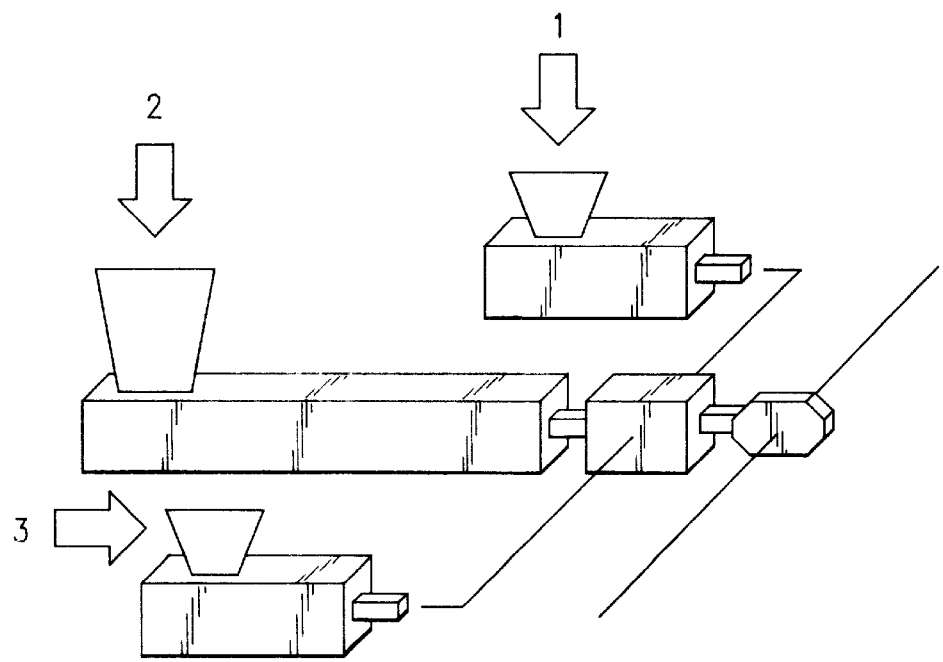
FIG. 3 corresponds to a schematic representation of the extrusion equipment that allows to extrude in one single step the three insulating layers of the conductor.

According to the drawings of FIGS. 1 to 3, the cable is made of three layers of insulating material consisting of polyvinyl chloride (PVC) compounds in the internal and external parts (1) and modified polyethylene in the central part (2).

The design shown in FIG. 1 presents a concentric cable with layers of insulating material extruded one on top of the other.

This is reached using only one extrusion head with 3 converging extruders, which is part of the manufacturing process described hereinbelow.

The innermost layer or first layer (1) is a polyvinyl chloride (PVC) based compound, natural color, with low smoke emission, low dielectric constant and 105 degrees C. thermal class, representing 30–40% of the total thickness of the insulating material applied to the electric cable. In general terms, this is the compound that gives the low smoke and high fire resistance properties.

The second layer (2) is a high density polyethylene with a flow index between 0.15 and 1 adequate for the extrusion processes, modified with ethylene copolymers to improve its adherence to the adjacent PVC layers in 0–60% as a humidity barrier, and with a thickness that represents 25–35% of the total thickness of the insulation applied to the electric cable. In general terms, it is the waterproof compound.

The third layer or upper layer (3) is a polyvinyl chloride (PVC) based compound that can be colored, with low smoke emissions, low dielectric constant, high mechanical resistance, high sliding grade, representing 30–35% of the total thickness of the insulation applied to the electric cable. In general terms, it is the compound that gives mechanical characteristics and appearance to the cable.

The electric conductor (4) is a soft copper wire or cable that meets the requirements mentioned in NMX J-036.

The manufacturing process includes extruding the materials at the same time and are passed through an extrusion head that forms the abovementioned concentric layers. The innovation of the process consists in determining the process conditions that permit to give dimensional stability to the product. Besides, the final diameter of the product is constantly maintained according to the abovementioned specifications.

FIG. 3 is a schematic representation of the manufacturing process of the triple co-extruded insulating layer construction cable.

In the composition formulations of low tension electric insulations, polyvinyl chloride (PVC) is widely used because of its availability, low cost, mechanical properties, chemical and weather resistance and because of its dielectric properties. For the purpose of this invention, the use of the PVC is always with the addition of conventional plasticizers to eliminate its natural stiffness and give it flexibility. Other additives are also employed such as: thermal stabilizers, lubricants, pigments, loads, impact modifiers and flame retardants that are added to the compound to modify it and obtain the required properties.

The polyvinyl chloride compounds designed must be highly flame resistant, must generate a minimum level of obscure smoke, and must also present low corrosivity to protect both the people present in a fire, as well as the fire detection electronic devices and equipments that are in the fire area. Besides, with the addition of all these additives, PVC compounds are required that have good processing properties with mechanical and weather resistance characteristics within defined values.

Since the introduction of the Mexican norm NMX-J-10, for THHW-LS (the suffix LS indicates low smoke generation and low acidity) type cables, it has been necesary to develop compounds based on PVC polymeric resin with characteristics to meet the following requirements:
Tensile strength to failure
Elongation to failure
Resistance to high temperatures (oven aged)
Resistance to mineral oil
Low smoke generation during combustion
Low acid gas emission during combustion
Electric resistance
Flame propagation resistance
Flexion resistance at low temperatures
Limited deformation at high temperatures
Water absorption resistance
Maximum dielectric constant of 10 at 75 degrees C.
Resistance to sudden temperature changes (thermal shock)

The present invention comprises of a PVC based polymeric composition, both in insulation as well as in the cover, with flame retardance properties, low smoke emission, low acidity and low water absorption, characterized by a synergistic mixture of the following components:
Polyvinyl chloride
Dibasic lead phtalate
Mineral loads
Antimonium trioxide
Barium metaborate
Zinc organic compounds
Lubricant
Trimethylic plasticizers The amounts of the component are expressed in parts per hundred of resin or the sum of this with other involved resins.

All the components that constitute the formulae are commercial materials according to the following information:
a RESINA DE PVC 250, PVC resin of high viscosity and high molecular weight. Chemical Abstracts Registry No. 9002-86-2, supplier: GRUPO PRIMEX, S.A. DE C.V.
b Dibasic lead phtalate, Chemical Abstracts Registry No. 68388-85-3, supplier: EAGLE PASS
c CALFROST 1, Micronized calcium carbonate, Chemical Abstracts Registry No. 1317-65-3, supplier: MOLINOS DEL NORTE, S.A.
d SANTINTONE SP-33, Aluminum silicate, Chemical Abstracts Registry No. 39388-40-4, supplier: ENGELHARD CORP.
e ZB-223, Zinc borate, Chemical Abstracts Registry No. 14720-55-9, supplier: Charlotte Chemical Inc.
f Dibasic lead phtalate, Chemical Abstracts Registry No. 56189-09-4, supplier: DERIVADOS METAL-ORGANICOS, S.A. DE C.V.
g Plasticizers DOTP-E, Chemical Abstracts Registry No. 6422-86-2, supplier: EASTMAN CHEMICAL Co.
h Palatinol 79TM, Tri-heptyl trimethylate plasticizers, Chemical Abstracts Registry No. 68515-60-6, supplier: BASF MEXICANA, S.A. DE C.V.
i Jayflex TINTM, Tri-isononyl trimethylate plasticizers, Chemical Abstracts Registry No. 53894-23-8, supplier: EXXON MEXICANA, S.A. DE C.V.
j Antimonium trioxide, flame retardant, Chemical Abstracts Registry No. 01309-64-4, supplier: ANZON INC.
k Barium metaborate, flame retardant, Chemical Abstracts Registry No. 13701-59-2, supplier: BUCKMAN LABORATORIES, S.A. DE C.V.
l Bisphenol "A", antioxidant, Chemical Abstracts Registry No. 68784-69-0, supplier: RHONE POULENC. 68784-69-0, supplier: RHONE POULENC.

In thermoplastic materials based on PVC, lead stabilizers such as dibasic lead phtalate and dibasic lead sulfate are frequently used as thermal stabilizers. However, in principle, other types of thermal stabilizers can be used, among them barium, cadmium or zinc soaps.

Similarly, other antioxidants, besides BISPHENOL A, can be used, among them: AGERITE (mixture of polybutylated bisphenol A) from RT VANDERBILT.

With regard to aluminum silicate SANTINTONE SP-33, in principle other silicates can be used such as SANTINTONE 2 from Engelhard and BURGESS 30 from Burgess.

The polymeric compositions with flame retardance, low smoke generation, low acidity and low water absorption characteristics of the present invention include the following components in the mentioned quantities.

Polyvinyl chloride as Primex 225-1 or 250 resin in an amount that ranges from 60 parts to 100 parts.

At least one thermal stabilizer used in PVC compounds for insulating electric cable such as dibasic lead phtalate, in an amount that ranges from 6 parts to 12 parts per hundred of resin.

At least one efficient antioxidant for thermoplastic materials based on PVC such as BISPHENOL "A", in a total amount that ranges from 0.2 parts to 1.2 parts per hundred of resin.

At least one lubricant efficient for thermoplastic material based on PVC such as lead stearate or similar, in a total amount that ranges from 0.15 parts to 4.0 parts per hundred of resin.

At least one plasticizers defined by the thermal grade of the compound that can be used since DOP till TINTM through lineal type plasticizers in an amount that ranges from 10 parts to 60 parts per hundred of resin.

A burnt aluminium silicate load in an amount that ranges from 5 parts to 40 parts per hundred of resin.

A calcium carbonate load in an amount that ranges from 5 parts to 70 parts per hundred of resin.

A primary flame retardant based on antimonium trioxide or similar in amounts ranging from 0.5 parts to 8 parts per hundred of resin and another secondary flame retardant based on barium or similar in amounts ranging from 0.5 parts to 8 parts per hundred of resin.

A smoke reducer based on a material based on zinc inorganic complex in amounts ranging from 1 part to 6 parts per hundred of resin.

PROCEDURE TO PREPARE THE COMPOSITION

The plasticizers are weighed and added to the PVC resin together with the stabilizer in the intensive mixer at a temperature of about 70 degrees C.; then the loads and the lubricant are added. The mixing operation continues till the formation of the dry mixture which is cooled at the end, in a water jacket cooler to reduce the temperature of the mixture, preventing the formation of agglomerates that hinder the powder free flow. Once the mixture reaches a temperature 10–15 degrees C. above room temperature, the plasticization process begins. The process can be performed in a double spindle extruder or in a "kno-kneader" type extruder that plasticizers the mixture and forms pellets or "granules. A Banbury internal mixer can also be used, in which the compound is processed up to a temperature of about 160 degrees C. unloading the material on a roller mill where a band is obtained which is finally cut in granules.

The composition formulation, both of the insulating layer (1) as well as of the cover layer (3) of the present invention, optimized for its use in electric cable, was prepared according to the above described characteristics.

The cable obtained according to the formulation of the present invention was submitted to the tests indicated by the Mexican norm NMX-J-10, using the following test procedures:

NMX-J-40 Electric industry—Determination of humidity absorption in insulation and protective covers of electric conductors—Test method.

NMX-J-93 Electric products—Conductors—Determination of fire propagation resistance in electric conductors—Test methods.

NMX-J-177 Determination of thicknesses of semiconductor screens, insulations and protective covers for electric conductors.

NMX-J-178 Determination of tensile strength to failure and ultimate elongation of semiconductor screens, insulations and protective covers for electric conductor—Test method.

NMX-J-186 Accelerated aging in oven for semiconductor screens, insulations and protective covers for electric conductors—Test methods.

NMX-J-189 Electric products—conductors—flexibility of electric conductors insulated with polyvinyl chloride (PVC)—Test method.

NMX-J-190 Thermal shock resistance of PVC insulations and protective covers for electric conductor—Test method.

NMX-J-191 Heat deformation of semiconductor screens, insulations and protective covers for electric conductors—Test method.

NMX-J-193 Cold bending of insulations and protective covers for electric conductors—Test method.

NMX-J-194 Accelerated aging in oil for insulations and protective covers of insulated electric conductors—Test method.

NMX-J-292 Electric products—conductors—protective covers based on thermoplastic materials for low, medium and high tension energy cable.

NMX-J-294 Electric products—conductors—insulation resistance—Test method.

NMX-J-472 Electric products—conductors, determination of the amount of halogenated acid gas generated during the controlled burning of polymeric materials taken from electric conductors—Test method.

NMX-J-474 Electric products—conductors— determination of the specific optic density and the clouding value of the smoke generated in electric conductors or in their individual components under controlled burning conditions and under fire conditions—Test method.

The above described invention is considered a novelty and its scope is limited only by the following claims.

We claim:

1. A co-extruded triple layer electric conductor for cable insulation having a low humidity absorption insulation, a low emission of toxic gases and smoke and a high flame resistance, comprising: a) an electric conductor core and b) three coextruded insulating layers around the conductor core; said three layers, comprising:
   a) a first layer of said three insulating layers over the conductor core, having said low emission, said low dielectric constant and a thermal class of 105° C.; said first layer comprising a polyvinyl chloride compound as a base;
   b) a second layer of said three insulating layers over said first layer, as a humidity barrier comprising a high density polyethylene compound having a flow index of from about 0.15 to about 1.0; said polyethylene, optionally modified with an ethylene copolymer having a concentration of from about 0 to about 60% by weight; and
   c) a third layer of said three insulating layers over said second layer and, having said low emission and said low dielectric constant; said third layer comprising said polyvinyl chloride compound as said base.

2. The co-extruded triple layer conductor cable according to claim 1 comprising:
   a) said first layer comprising from about 35% to about 45% of total insulation thickness,
   b) said second layer comprising from about 25% to about 35% of total insulation thickness said polyethylene modified with ethylene copolymer,
   c) said third layer comprising from about 30% to about 35% of total insulation thickness.

3. The co-extruded triple layer electric conductor cable according to claim 1 wherein the polyvinyl chloride in the first and third layer is mixed in a ratio of about 60 to about 100 parts of the polyvinyl chloride by weight with additive components selected from the group consisting of a plasticizer, a thermal stabilizer, an antioxidant, a lubricating agent, a mineral load, a flame retardant, a smoke reducer and mixtures thereof.

4. The co-extruded triple layer electric conductor cable according to claim 3 wherein the said additive comprises per hundred of a resin:
   a) from about 10 to about 60 parts of said plasticizer;
   a) from about 6.0 to about 12 parts of said thermal stabilizer;
   b) from about 0.2 to about 1.2 parts of said antioxidant;
   c) from about 0.15 to about 4.0 parts of said lubricating agent;
   d) from about 5.0 to about 40 parts of said mineral load;
   e) from about 5.0 to about 70 parts of said calcium carbonate;
   f) from about 0.5 to about 8 parts by weight of said flame retardant;
   g) from about 1.0 to about 6.0 parts by weight of said smoke reducer.

5. The co-extruded triple layer electric conductor cable according to claim 4 wherein the said plasticizer is selected from the group consisting of a trimethyl plasticizer, a tri-isononyl trimellitate plasticizer and a triheptyl plasticizer.

6. The co-extruded triple layer electric conductor cable according to claim 4 wherein the said thermal stabilizer is selected from the group consisting of a dibasic lead phthalate, a dibasic lead sulfate, a barium, a cadmium and a zinc soap.

7. The coextruded triple layer electric conductor cable according to claim 4 wherein the said antioxidant is selected from the group consisting of a bisphenol A, a polybutylated bisphenol A and mixtures thereof.

8. The co-extruded triple layer electric conductor cable according to claim 4 wherein the said lubricating agent is selected from the group consisting of a lead stearate and derivatives thereof.

9. The co-extruded triple layer electric conductor according to claim 4 wherein the said mineral load is selected from the group consisting of an aluminum silicate, a calcium carbonate and a zinc borate.

10. The co-extruded triple layer electric conductor cable according to claim 4 wherein the said flame retardant is selected from the group consisting of a barium metaborate and an antimonium trioxide.

11. The co-extruded triple layer electric conductor cable according to claim 3 wherein the smoke reducer is selected from the group consisting of a zinc inorganic complex and derivatives thereof.

12. The co-extruded triple layer electric conductor cable according to claim 3 wherein the additive comprises:
a) said plasticizer selected from the group consisting of said trimethyl plasticizer, said tri-isononyl trimellitate plasticizer and said triheptyl plasticizer;
b) said thermal stabilizer selected from the group consisting of said dibasic lead phthalate, said dibasic lead sulfate, said barium, said cadmium and said zinc soap;
c) said antioxidant selected from the group consisting of said bisphenol A, said polybutylated bisphenol A and mixtures thereof;
d) said lubricating agent selected from the group consisting of said lead stearate and derivatives thereof;
e) said mineral load selected from the group consisting of said aluminum silicate, said calcium carbonate and said zinc borate;
f) said flame retardant selected from the group consisting of said barium metaborate and antimonium;
g) said smoke reducer selected from the group consisting of said zinc inorganic complex and derivatives thereof.

13. The co-extruded triple layer electric conductor cable according to claim 12 wherein the additive comprises:
a) said from about 10 to about 60 parts trimethyl plasticizer;
b) said from about 6.0 to about 12 parts dibasic lead phthalate;
c) said from about 0.2 to about 1.2 parts of bisphenol;
d) said from about 0.15 to about 4.0 parts of lead stearate;
e) said from about 5.0 to about 40 parts of aluminum silicate mineral load;
f) said from about 5.0 to about 70 parts of calcium carbonate;
g) said from about 0.5 to about 8 parts by weight of antimonium trioxide;
h) said from about 1.0 to about 6.0 parts by weight of zinc inorganic complex.

14. The co-extruded triple layer electric conductor cable according to claim 1 wherein the electric conductor is a soft copper wire.

15. The co-extruded triple layer electric conductor cable of claim 1 wherein said polyethylene of second layer b) is modified with an ethylene copolymer whereby the adherence of said second layer to the adjacent polyvinyl chloride layers is improved.

16. A process for preparing a co-extruded triple layer electric conductor cable having low humidity absorption insulation, low emission of toxic gases and smoke and a high flame resistance, comprising the steps of:
a) providing a first layer around the conductor core having a low smoke emission, a low dielectric constant and a thermal class of 105° C., said first layer comprising polyvinyl chloride compound as a base;
b) depositing a second layer over said first layer, comprising a high density polyethylene compound having a flow index of from about 0.15 to about 1.0; said polyethylene modified with an ethylene polymer having a concentration of from about 0 to about 60% over said first layer;
c) depositing a third layer over said second layer having a low emission and a low dielectric constant, comprising a polyvinyl chloride compound as a base;
d) separately preparing the polymeric composition of each of the insulating layers of (a), (b) and (c);
e) simultaneously extruding the said layers in an arrangement of similar size extruders;
f) passing the layers through an extrusion head; said head overlapping the three insulating layers forming one sole concentric insulating layer around the conductor core; and
g) preventing the individual layers from diffusing among them.

17. The process for preparing a co-extruded triple layer electric conductor cable according to claim 16 wherein the extrusion process is conducted under processing conditions to form an insulating product having dimensional ability.

18. The process for preparing a co-extruded triple layer electric conductor cable according to claim 16 further comprising mixing the polyvinyl chloride in the first and third layer in a ratio of about 60 to about 100 parts by weight with additive components.

19. The process for preparing a co-extruded triple layer electric conductor cable according to claim 18 wherein the additive components are selected from the group consisting of plasticizer, thermal stabilizer, mineral load, flame retardant, antioxidant, smoke reducer, lubricating agent, plasticizer and mixtures thereof.

20. A process for insulating an electric conductor core comprising the steps of:
a) providing a co-extruded triple layer electric conductor cable having a low humidity absorption insulation, a low emission of toxic gases and smoke and a high flame resistance, comprising:
i) a first layer over the conductor core, having a low smoke emission, a low dielectric constant and a thermal class of 105° C.; said first layer comprising polyvinyl chloride compound as a base;
ii) a second layer over said first layer, as a humidity barrier comprising a high density polyethylene compound having a flow index of from about 0.15 to about 1.0; said polyethylene modified with an ethylene polymer having a concentration of from about 0 to about 60%;
iii) a third layer over said second layer, having a low emission, a low dielectric constant, a high mechanical resistance and a high sliding grade; said third layer comprising polyvinyl chloride compound as a base;

b) applying the triple insulating layers around the conductor core.

21. A co-extruded triple layer electric conductor cable having low humidity absorption insulation, low emission of toxic gases and smoke and a high flame resistance prepared by a process comprising the steps of:

a) providing a first layer around the conductor core comprising polyvinyl chloride compound as a base;

b) depositing a second layer over said first layer, comprising a high density polyethylene compound having a flow index of from about 0.15 to about 1.0; said polyethylene optionally modified with an ethylene polymer having a concentration of from about 0 to about 60% over said first layer;

c) depositing a third layer over said second layer, comprising a polyvinyl chloride compound as a base;

d) separately preparing the polymeric composition of each of the insulating layers of (a), (b) and (c);

e) simultaneously co-extruding the said layers in an arrangement of similar size extruders;

f) passing the layers through an extrusion head; said head overlapping the three insulating layers forming one sole concentric insulating layer around the conductor core, and g) preventing the individual layers from diffusing among them.

* * * * *